UNITED STATES PATENT OFFICE.

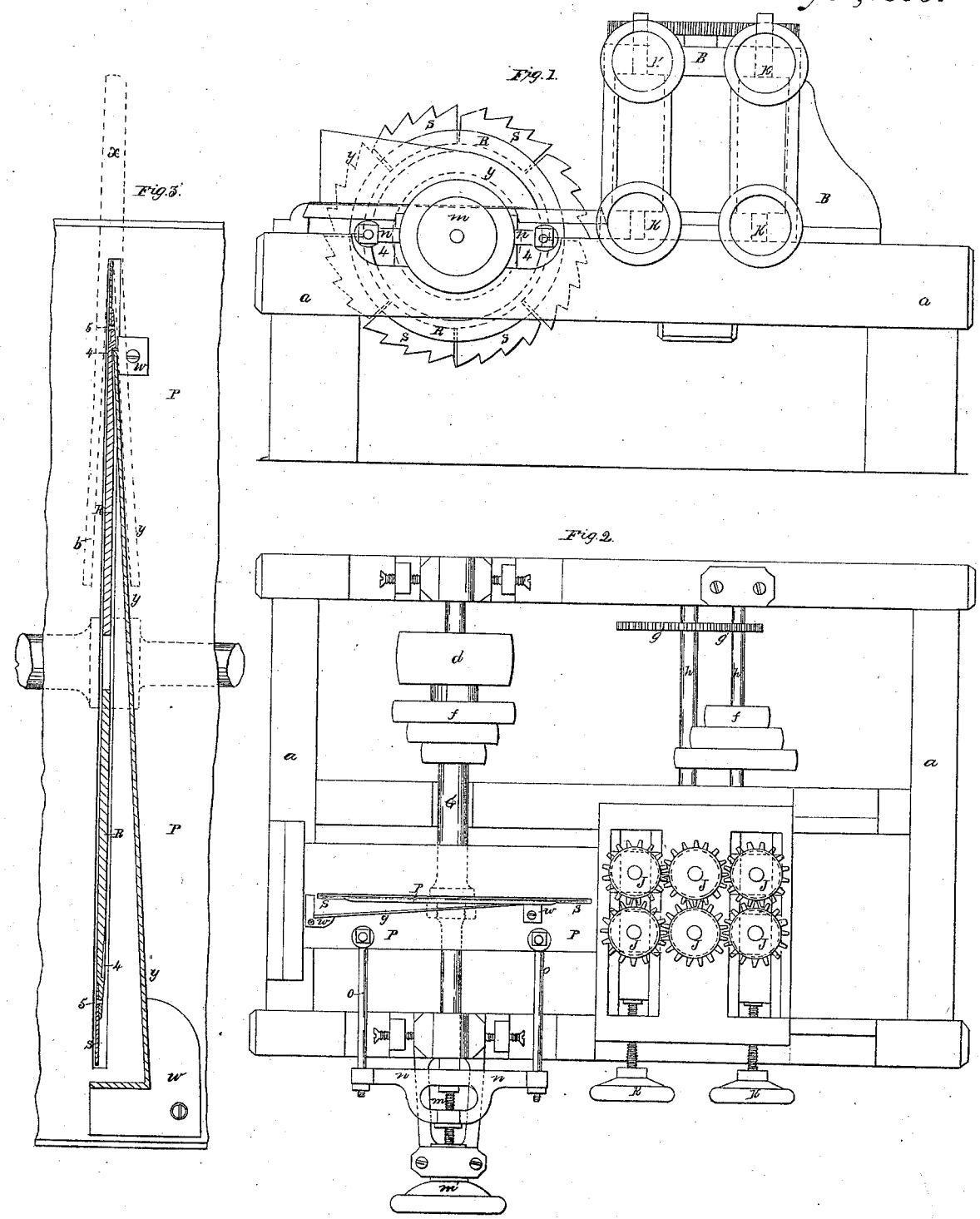

WILLIAM D. LEAVITT, OF CINCINNATI, OHIO.

METHOD OF ATTACHING THE SPREADER TO SAWS OF CIRCULAR SAWING MACHINES.

Specification of Letters Patent No. 21,345, dated August 31, 1858.

*To all whom it may concern:*

Be it known that I, WILLIAM D. LEAVITT, of the city of Cincinnati, in the county of Hamilton and State of Ohio, have invented a new and useful Improvement in Circular Saws for Resawing Lumber; and I do hereby declare that the following is a full, clear, and exact description of its structure and operation, reference being had to the accompanying drawings, and to the letters and figures of reference marked thereon, and made to form part of this specification.

Like letters and figures refer to the same parts of the improvement.

The larger class of circular saw mills employed for resawing lumber usually have what is denominated a spreading flange or flanges arranged to the side or sides of the saw plate, for the purpose of spreading the lumber as it is being sawed from the side of the saw plate, to prevent friction and heating of the saw, by the lumber coming in contact with it. But it has always been an impossible thing to arrange the spreading flanges with the sides of the saw so that the end of the lumber when being sawed would not butt or catch against the end of the spreading flanges together with the splinters often produced by sawing a shivered piece of timber.

The nature of my improvement to avoid this difficulty consists in furnishing the side of the saw plate, a suitable distance from its edge with a groove or recess, and made in a proper form to secure the forward end of the spreading flange and make the groove deep enough so that the outside surface of the flange at its forward end will come flush with the side of the saw plate when the flange is properly arranged with the saw plate as will be hereinafter described and represented—and thus preventing the lumber from catching or butting against the end of the flange—by having it embedded in the groove in the side of the saw plate.

To enable others skilled in the art to make and use the improvement I will proceed to describe its construction and operation by referring direct to the accompanying drawings.

Figure 1, is a side elevation of a sawing machine to which the improvement is attached. Fig. 2, is a top view of the same and Fig. 3, is a sectional view through the diameter of the saw plate and horizontally through the spreading flange showing the arrangement of the flange with the saw plate and bed piece (P, P).

Before referring direct to the improved parts I will give a general description of the structure of the machine in connection with which the improvement is used. The general structure of this machine will be found similar to the one I had patented June 3d 1856.

(a, a) is the general frame work of the machine.

(B,) is a frame carrying the rollers for feeding and presenting the lumber to the saw.

(C) is the main shaft to which the main driving pulley (d) is attached, and pulley (f) for giving motion to the feeding gearing with a belt, consisting of the shafts (h, h,) wheels (g, g,) and bevel gearing (not represented) arranged under the feeding rollers which bevel gearing is operated with the lower shaft (h).

The screw (m) which forms part of the shafts (C) and wheel (m') cross piece (n, n,) and rods (o, o,) attached to the bed (P, P,) are employed for moving the shaft and saw with it, to regulate the thickness of the piece being sawed.

(J, J, J,) are wheels attached to the top of the feeding rollers for giving and regulating their motion.

(R), Fig. 3, is the saw plate and furnished with eight segments S, provided with teeth as represented the segments are attached to the plate with rivets (5, 5).

(y, y,) is the spreading flange and (4) is the groove or recess cut in the side of the saw plate, a suitable distance from its edge, in which the forward end of the spreading flange is placed as represented so that the outside of the forward end of the flange will come flush with the side of the saw plate as represented and the flange (y) thus arranged with the plate will present the end of lumber when being sawed from hitting against the end of the spreading flange but will pass from the side of the saw plate to the side of the flange as represented in Fig. 3 by the dotted lines (x, y, v).

With the stress produced by spreading but one side of the board from the saw plate it will spread the other side away from the saw plate sufficient, without the use of a flange—as represented in Fig. 3. The spreading flange at its forward end is made circular to fit in the groove (4) in the saw plate—and the flange is attached to the bed piece (P, P,) with lugs (w, w,) as represented.

I do not wish to be understood as claiming the spreading flange when taken separately but What I do claim, and desire to secure by Letters Patent, is—

Furnishing the side of the saw plate with the groove or recess (4,) when the spreading flange (y, y,) is arranged therewith, in the manner represented, for the purpose of preventing the end of the lumber when being sawed from butting against or catching to the end of the said flange, as mentioned in the foregoing specification.

WILLIAM D. LEAVITT.

Witnesses:
W. BENSON,
CHARLES H. FOX.